(12) United States Patent
Hartman

(10) Patent No.: US 9,629,109 B2
(45) Date of Patent: Apr. 18, 2017

(54) TECHNIQUES FOR OPTIMIZING NETWORK EVENT TIMERS

(71) Applicant: Landis+Gyr Innovations, Inc., Alpharetta, GA (US)

(72) Inventor: James Hartman, Canton, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 213 days.

(21) Appl. No.: 14/697,931

(22) Filed: Apr. 28, 2015

(65) Prior Publication Data

US 2016/0323837 A1    Nov. 3, 2016

(51) Int. Cl.
*H04W 56/00* (2009.01)
*H04L 12/26* (2006.01)
*H04W 84/12* (2009.01)

(52) U.S. Cl.
CPC ....... *H04W 56/001* (2013.01); *H04L 43/0852* (2013.01); *H04W 56/002* (2013.01); *H04W 84/12* (2013.01)

(58) Field of Classification Search
None
See application file for complete search history.

(56) References Cited

U.S. PATENT DOCUMENTS

| 2012/0224590 A1* | 9/2012 | Norair | H04L 1/0061 370/447 |
|---|---|---|---|
| 2014/0376526 A1 | 12/2014 | Nishikata et al. | |
| 2015/0043440 A1* | 2/2015 | Ko | H04W 74/04 370/329 |

FOREIGN PATENT DOCUMENTS

WO    2016175988    11/2016

OTHER PUBLICATIONS

Chen et al., "Time Synchronization for Predictable and Secure Data Collection in Wireless Sensor Networks", Retrieved from the Internet: URL:http://dunkels.comjadamjchen07time.pdf, Jun. 15, 2007, pp. 165-172, 8 pages.
International Application No. PCT/US2016/026019, "International Search Report and Written Opinion", Jun. 22, 2016, 12 pages.
IEEE Std 802.15.4g—2012; IEEE Computer Society, New York, NY, Apr. 27, 2012, 252 pages.

* cited by examiner

*Primary Examiner* — Paul H Masur
*Assistant Examiner* — Michael Phillips
(74) *Attorney, Agent, or Firm* — Kilpatrick Townsend & Stockton LLP

(57) ABSTRACT

Disclosed are various embodiments for optimizing network event timers for a node. The node obtains data for transmission by the node via a network. The node uses time intervals of a clock as a basis for determining actions associated with the network. A transmission duration is calculated that corresponds to the time for transmitting the data via the network based on a data rate of the network and a size of the data. The node calculates a transmission delay based on the transmission duration. The transmission delay is less than a clock interval and controls when transmission of the data is completed by the node. After the expiration of the transmission delay, the node transmits the data via the network. The node initiates an event timer when the transmission is completed, where the event timer measures time based upon counting the time intervals elapsed since the event timer began.

20 Claims, 5 Drawing Sheets

TECHNIQUES FOR OPTIMIZING NETWORK EVENT TIMERS

BACKGROUND

In networks, such as a wireless mesh network defined by the Institute of Electrical and Electronics Engineers (IEEE) 802.15.4 family of standards, some types of data transmissions can be sent for which an acknowledgement is expected from the data recipient. The network standards may define a timeout period within which the acknowledgement should be received by the sender. In the event an acknowledgement is not received within the timeout period, the sender of the data can initiate a responsive action, such as retransmitting the data to the recipient, generating an error, and/or other possible responses. In order for the network to operate efficiently and to adhere to the network standards, devices communicating in the network need to agree, to a degree of precision, on the amount of time elapsed between various network events, such as between transmitting data and receiving an acknowledgement. While clocks of the network devices may be sufficiently accurate, in some situations the precision of timers used to measure timeouts for network events can lack the necessary precision to conform to network standards.

SUMMARY

Various aspects of the present invention relate to optimizing network event timers for a node in a network. In one implementation, the node obtains data for transmission by the node via a network. Time intervals of a clock are used by the node as a basis for determining actions associated with the network. A transmission duration is calculated that represents the time required to transmit the data via the network based on a data rate of the network and a size of the data. The node may calculate an offset that is equal to a remainder from the transmission duration divided by a length of each of the time intervals. The node may further calculate a transmission delay that is equal to a difference between the offset and the length of each of the time intervals.

The node transmits the data via the network subsequent to a transmission delay based on the transmission duration. The transmission delay enables transmission of the data to begin when completion of the transmission will coincide with, or be within a threshold thereafter of, completion of one of the time intervals of the clock. The transmission of the data may begin subsequent to completion of one of the time intervals, followed by a length of time equal to the transmission delay. The node initiates an event timer upon completion of the transmission, where the event timer measures time based upon counting the time intervals elapsed since the event timer began. The event timer may be used by the node to measure the amount of time spent waiting to receive an acknowledgement of the data from a recipient.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
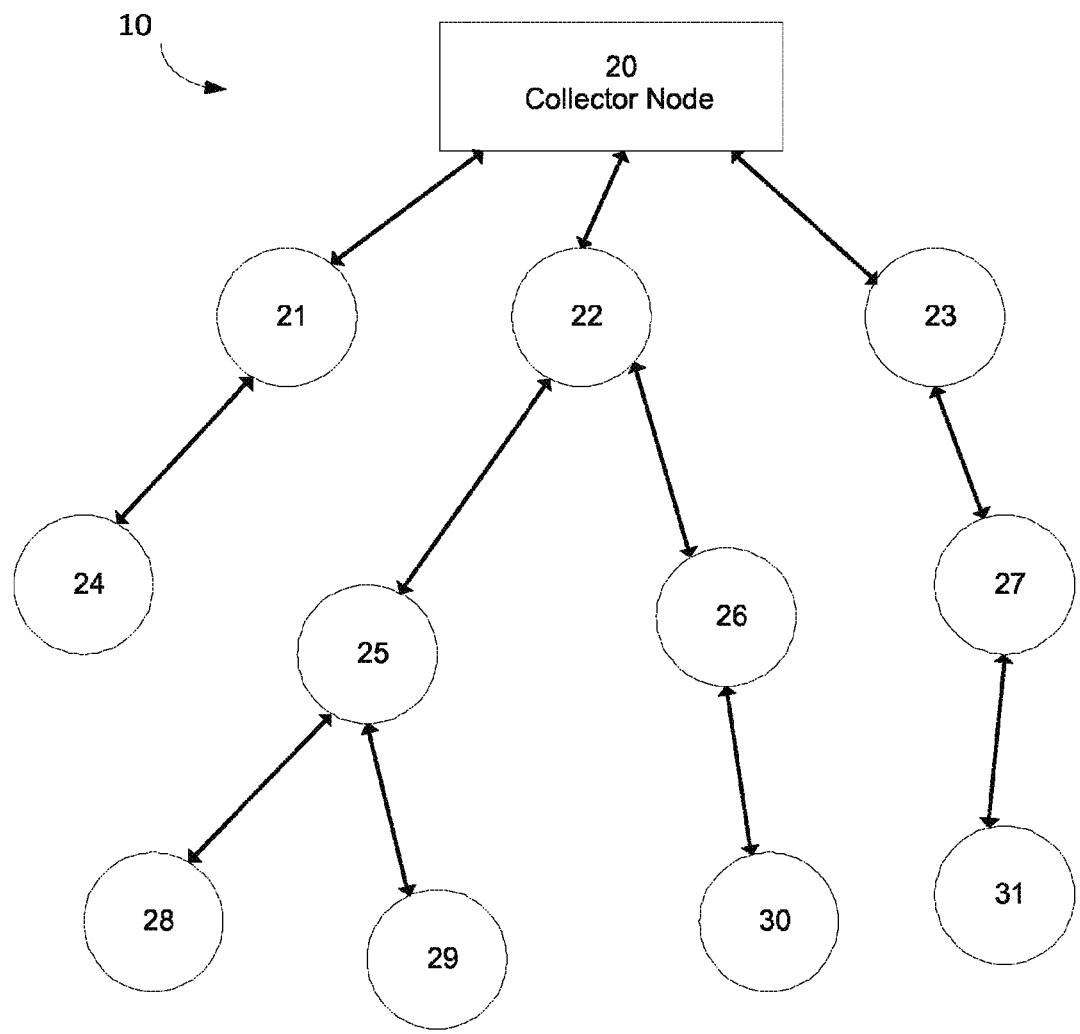
FIG. 1 is a drawing of a mesh network according to various embodiments of the present disclosure.

The techniques disclosed herein are directed to optimizing the resolution of network event timers for devices in a network, such as a wireless mesh network defined by the IEEE 802.15.4 family of standards or other possible network types. For example, in a mesh network, each node can acquire or identify other nodes with which it can communicate (commonly referred to as neighboring nodes), and obtain certain information and performance metrics about these nodes to facilitate communication. Nodes can use the metrics to score each of the nodes they identified to determine which identified node provides the best option for sending information to a destination and for receiving messages, i.e., a parent node. A node that has identified a parent node may be synonymously be referred to as a child node of the parent node.

By identifying other nodes as explained and establishing communication links with these nodes, each node establishes its own network of nodes which it can leverage for sending and receiving information in the mesh network. A node can rely on its parent node for receiving messages from a central node or other nodes, for example. Some network standards can define one or more types of messages for which a recipient node should send an acknowledgment (commonly referred to as an "ACK") to the sender node when the message is successfully received. The messages for which an acknowledgement should be sent after being received may be referred to as "acknowledged frames." These standards may further define a timeout period whereby a sender of an acknowledged frame may initiate a responsive action (e.g. resending the frame) if no acknowledgement has been received from the message recipient within the timeout period. In order to comply with such standards and ensure proper operation in the network, the nodes of the network should use timers that precisely measure time for these defined time periods, such as for a timeout period.

While the nodes may use clocks that are sufficiently precise, the timers in the nodes may measure the time elapsed for network events in terms of clock "ticks" elapsed since the start of the timer for the network event. The clock ticks mark the boundary between time intervals for the clock. For example, a clock may use time intervals of 1 millisecond (ms), whereby the elapsed time between clock ticks is equal to one of the time intervals, namely 1 ms in this example. If timers are started other than at the beginning of a time interval, the time elapsed before the next clock tick will be less than the full length of the time interval. However, timers of the node may nonetheless be configured to count each clock tick as though the full length of the time interval has elapsed. Therefore, in order to improve the accuracy of the count, implementations herein are configured to start timers at the beginning of a time interval.

To that end, if an event timer should be started upon completion of a data transmission, the node needs to determine the transmission duration for the data such that transmission can be scheduled to complete coincident with completion of a time interval. As can be appreciated, it may also be acceptable for the data transmission to complete within an acceptable tolerance threshold just after completion of a time interval. In this manner, the precision of the network timers are optimized to within a given tolerance by isolating the timers from random variations in elapsed time due to starting a timer other than at the beginning of a time interval for the clock.

As defined herein, a "node" includes an intelligent device capable of performing functions related to distributing messages in a mesh network. In one system, a node can be a meter located at a facility, such as a house or apartment, that measures the consumption of a utility such as gas, water, or electric power. Such a meter can be part of an advanced metering infrastructure (AMI), radio frequency (RF) network. Other examples of nodes include a router, collector or collection point, host computer, hub, or other electronic device that is attached to a network and is capable of sending, receiving, or forwarding information over a communications channel.

A node can contain several components that enable it to function within implementations of the present invention. For example, a node can include a radio that can enable it to communicate with like nodes and/or other devices in the mesh network. The radio of each node may have a programmable logic controller (PLC)-like device that can enable the radio to function like a computer, carrying out computer and command functions to provide implementations of the present invention described herein. A node may also include a storage medium for storing information related to communication with other nodes. Such storage mediums can include a memory, a floppy disk, CD-ROM, DVD, or other storage devices located internal to the node or accessible by the node via a network, for example. A node may also include a crystal oscillator (i.e. a clock) to provide timekeeping and a battery to provide back-up power. Some nodes may be powered only by a battery.

As used herein, "transmission duration" refers to the length of time required to transmit a given amount of data. In some implementations, the data includes a payload and a frame for transmitting the payload on the network.

Referring now to the drawings, FIG. 1 depicts an exemplary mesh network 10 in which the techniques described herein may be implemented. The mesh network 10 can include a collector node 20 and radio nodes 21-31. The collector node 20 can serve as a collection point to which the nodes 21-31 may send information, such as measurements of the consumption of gas, water, or electric power at a facility associated with the node. Nodes 21-31, as previously discussed, can have sufficient networking and computing capability to communicate with other nodes in the mesh network and to make intelligent determinations to facilitate such communication. The "collector node" can be configured to have at least the same functionality and capabilities present in nodes 21-31. Additionally, the collector node 20 may include sufficient storage capability for storing information from nodes 21-31 and, in some examples, greater computing capability to process the information received from the nodes. In other examples, a headend system, such as a Command Center or other type of headend system, or other computing device (not shown) can be used to process the information received from the nodes.

Figure 2:
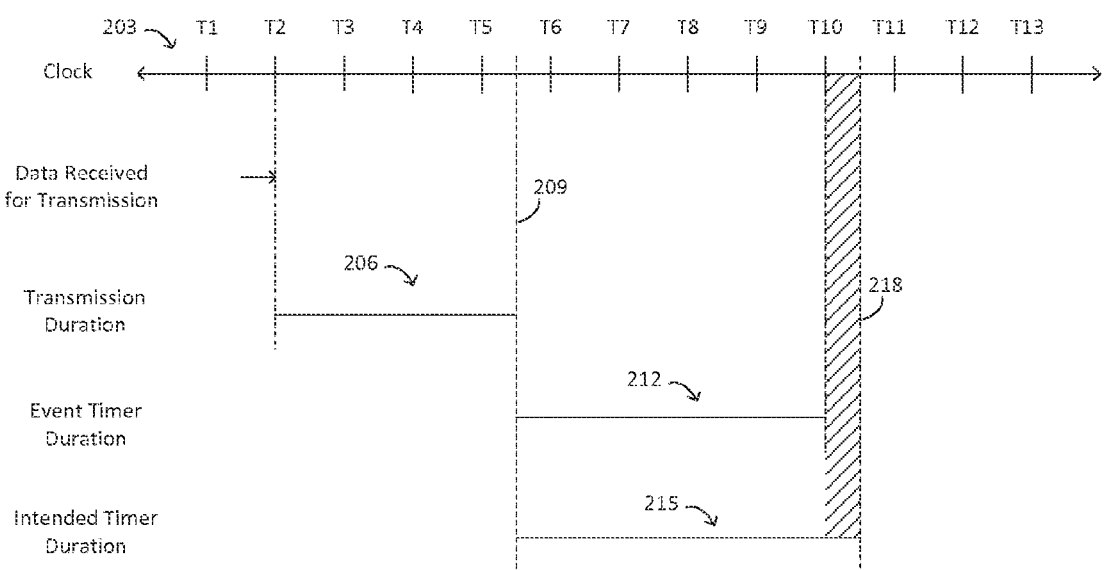
FIGS. 2 and 3 are exemplary timing diagrams for nodes in a network according to various embodiments of the present disclosure.

As described previously, during normal operation, the timers used for network events in a node 20-31 can exhibit reduced precision when the timers are started asynchronously from the time intervals used by a clock of the node. Shown in FIG. 2 is a timing diagram illustrating an example of a circumstance in which the precision of a timer in a node 20-31 is reduced due to asynchronicity with the clock of the node.

In this example, a node has obtained data to be transmitted via the network. On the timeline 203 for the clock in the node, the boundaries between time intervals of the clock are indicated with boundary markers T1-T13. The length of the time intervals may be any suitable duration, but for purposes of discussion in this example, the time interval length is 1 ms. As shown in the diagram, at boundary T2, data to be transmitted by the node has been obtained and is ready for transmission via the network. Without regard to the transmission duration 206 for the data or the time interval position of the clock when the transmission will complete, the node begins transmitting the data at once beginning at boundary T2.

At marker 209, between boundaries T5 and T6, the transmission of the data by the node completes. In this example, the data transmitted by the node is an acknowledged frame for which a network standard specifies that the sender of the data should receive an ACK within 5 ms after completing transmission of the data. The network standard further specifies that the sender of the data should resend the data if an ACK is not received following transmission of an acknowledged frame. Thus, in order to comply with the 5 ms waiting period for sending an acknowledged frame, the sending node configures a timer for 5 ms following completion of the data transmission of the acknowledged frame. As such, the timer also begins at marker 209.

As discussed previously, the timers of the node are configured to measure elapsed time by counting elapsed clock ticks. Since the timer in this example is configured for 5 ms and the clock ticks occur on 1 ms time intervals, the timer will be complete after five clock ticks have elapsed since the timer is set. Consequently, the event timer duration 212 ends at T10, five clock ticks after the timer begins at marker 209. Although five clock ticks have elapsed, the amount of time elapsed is less than the intended timer duration 215 that denotes a 5 ms duration because the timer was started between the T5 and T6 boundaries at marker 209 rather than at the T5 boundary. As such, the amount of time elapsed at the first clock tick for the timer (i.e. at the T6 boundary) was less than the full amount of time for a time interval. The alignment difference 218 denotes the difference between the intended timer duration 215 of 5 ms and the actual event timer duration 212 that is approximately 4.5 ms.

The consequence of timer imprecision in a node can be varied. Under the scenario described in FIG. 2, the shortened timer may lead to the node initiating a responsive action, such as retransmitting the data to the recipient, generating an error, etc., too soon (i.e. after 4.5 ms instead of 5 ms) and, potentially disregarding an ACK that complied with the 5 ms time period specified by the network standard. In practice, the length of the alignment difference 218 for the node will vary between near zero up to near 1 ms (i.e. one time interval), depending upon the point, relative to the time intervals of the clock of the node, at which the timer is started. If the timer is started near the start of a time interval, the alignment difference can be near zero, while if the timer is started just before the end of a time interval, the alignment difference could be near the duration of the time interval. In the example described in FIG. 2, the timer is started after the node transmits the data. Thus, if the transmission of the data is completed at a clock tick, or within a threshold thereafter, the alignment difference could be near zero for each data transmission.

Figure 3:
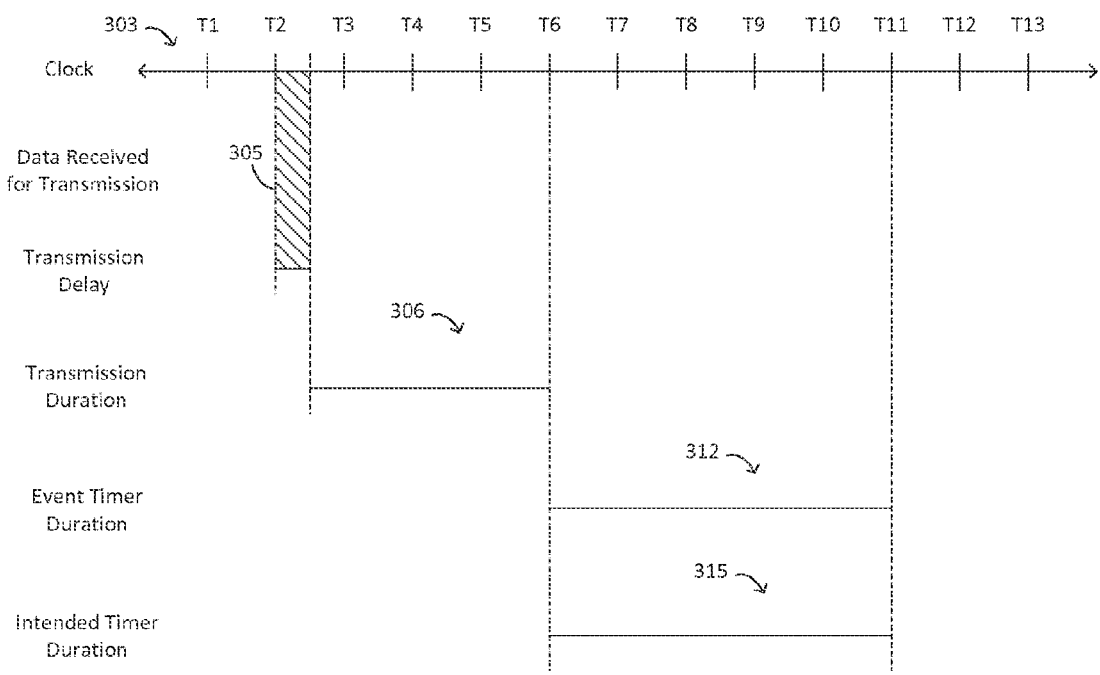

To that end, in FIG. 3, shown is a timing diagram illustrating an example of a circumstance in which the precision of a timer in a node 20-31 is optimized by scheduling data transmissions such that timers for the transmissions begin coincident with, or within a threshold thereafter of, clock ticks of the clock of the node. In this example, a node has again obtained data to be transmitted via the network. On the timeline 303 for the clock in the node, the boundaries between time intervals of the clock (i.e. clock ticks) are indicated with boundary markers T1-T13. The length of the time intervals may be any suitable duration, but for purposes of discussion in this example, the time interval length is 1 ms, the same length as in FIG. 2. As shown in the diagram, at boundary T2, data to be transmitted by the node has been obtained and is ready for transmission via the network. Rather than transmitting the data immediately or at a random time, the node in FIG. 3 determines how long the transmission duration for the data will be. For various networks on which the node communicates, the transmission duration may be based on the size of the data to be transmitted, the speed and/or bandwidth of the network, and possibly other considerations, as can be appreciated.

In the example shown in FIG. 3, the transmission duration is determined to be 3.5 ms based on the size of the data to be transmitted and the network. In general, an offset is then calculated to determine what, if any, fractional portion of a time interval will be required to transmit the data. Here, given a clock having a time interval of 1 ms and a transmission duration of 3.5 ms, the offset is 0.5 ms since the transmission of the data will require three complete time intervals and 0.5 ms of another time interval. Based on an offset of 0.5 ms and a time interval of 1 ms, the node calculates a transmission delay of 0.5 ms representing the amount of delay from a clock tick necessary for the transmission of the data to complete synchronous with completion of a subsequent time interval (i.e. at a subsequent clock tick). That is, given a transmission duration of 3.5 ms and a time interval of 1 ms, the node should use a transmission delay of 0.5 ms so that the data transmission will complete after four time intervals have elapsed. The transmission delay is illustrated in FIG. 3 as the transmission delay 305.

Thus, in order for the transmission of the data to complete coincident with completion of a subsequent time interval, the node delays transmission of the data for 0.5 ms from a clock tick. As shown in FIG. 3, the node begins the transmission 0.5 ms after the T2 boundary. Carrying out the transmission delay 305 in the node may be accomplished through use of hardware timers or other timer devices capable of the necessary precision. The node continues the transmission of the data through clock ticks marked by T3-T5, with the transmission duration 306 completing coincident with completion of the time interval at marker T6.

In this example, as in the example of FIG. 2, the data transmitted by the node is an acknowledged frame for which a network standard specifies that the recipient of the data should send an ACK within 5 ms of receiving the data. The network standard further specifies that the sender of the data should resend the data if an ACK is not received following transmission of an acknowledged frame. Thus, in order to comply with the 5 ms waiting period for sending an acknowledged frame, the sending node configures a timer for 5 ms following completion of the data transmission of the acknowledged frame. As such, the timer also begins at marker T6.

As discussed above, the timers of the node are configured to measure elapsed time by counting elapsed clock ticks. Since the timer in this example is configured for 5 ms and the clock ticks occur on 1 ms time intervals, the timer will be complete after five clock ticks have elapsed since the timer is set. Consequently, the event timer duration 312 ends at T11, five clock ticks after the timer begins at marker T6. Unlike the example in FIG. 2, here counting five clock ticks equals a 5 ms duration the because the timer begins coincident with a clock tick and each time interval between the clock ticks is a full 1 ms. Thus, the intended timer duration 315 that denotes a 5 ms duration also ends at T11. At this time, the node may undertake any determined action, such as reporting an error, retransmitting the frame, etc., if an acknowledgement for the transmitted frame has not yet been received by the node. Since the timer now accurately measures the elapsed time following network events, such as data transmissions, the node can comply with network standards specifying timed responses to such events.

Although the examples discussed in FIGS. 2 and 3 relate to a timer following transmission of an acknowledged frame, the techniques described herein can be applied to any timers used to measure elapsed time following a data transmission. For example, a node may be configured to transmit data according to some time interval (e.g. transmit a frame every 10 ms), to receive data for a reply from another node within a timeout value, and/or other possible scenarios as can be appreciated.

Figure 4:
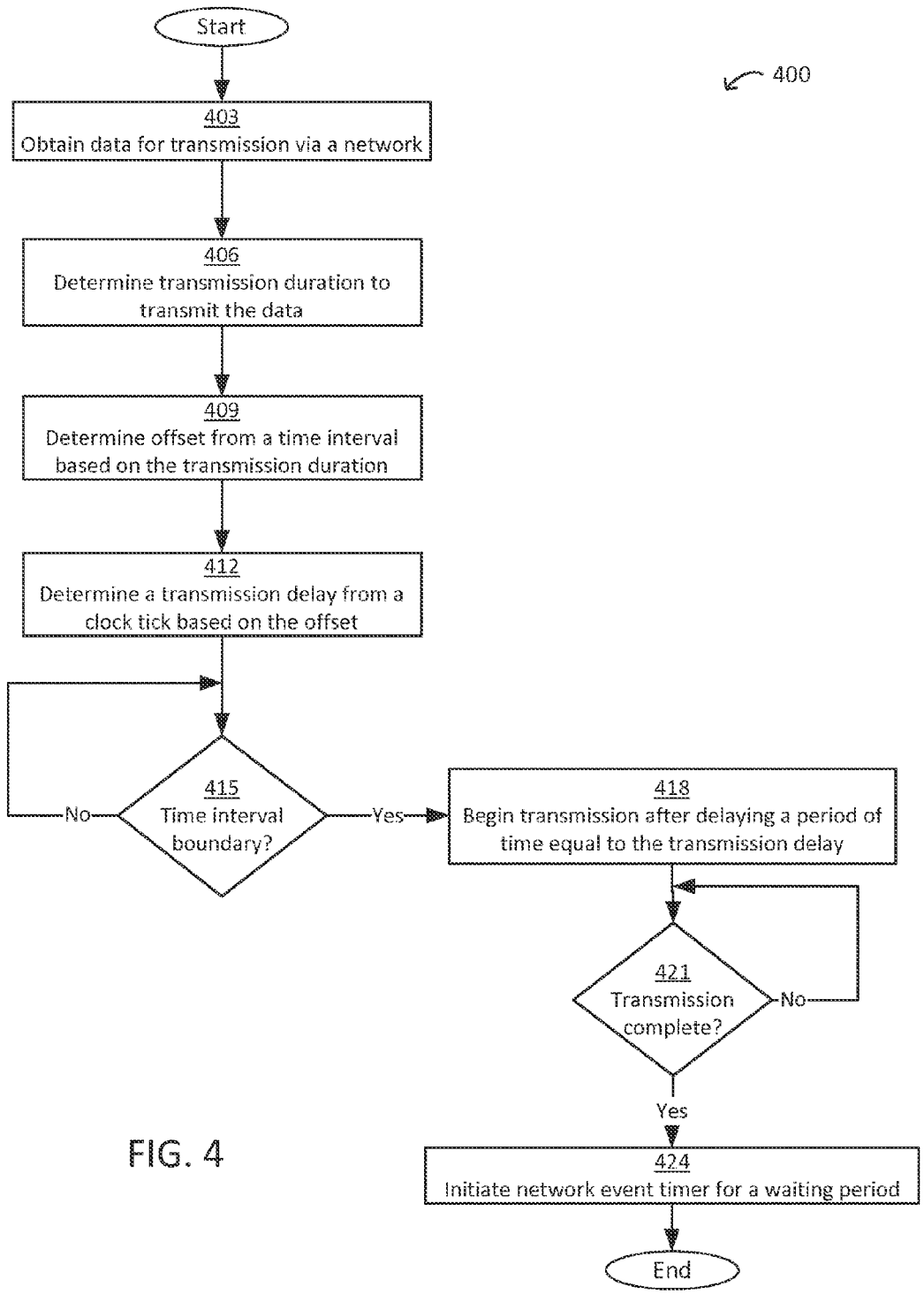
FIG. 4 is a flowchart illustrating one example of functionality implemented by a node in the network of FIG. 1 according to various embodiments of the present disclosure.

Referring next to FIG. 4, shown is a flowchart that provides one example of the timer optimization operations for a method 400 of a node 20-31 in the network 10 according to various embodiments. It is understood that the flowchart of FIG. 4 provides merely an example of the many different types of functional arrangements that may be employed to implement the timer optimization operations of the method 400 as described herein. The operations depicted in the flowchart of FIG. 4 may be initiated by a node 20-31 in the network 10 having data to be transmitted for which the elapsed time subsequent to completion of the transmission is to be measured.

Beginning in block 403, a node has obtained the data to be transmitted via the network. The data may be an acknowledged frame as defined in the IEEE 802.15.4 family of standards, data to be transmitted on a periodic basis, data for which the node should receive a reply or other response from another node within a timeout value, and/or other data to be transmitted for which the elapsed time subsequent to completion of the transmission is to be measured.

Next, the node determines the transmission delay needed for completion of the transmission of the data to coincide with, or be within a threshold thereafter of, completion of a time interval of a clock for the node. One possible arrangement of operations for determining the transmission delay is described in blocks 406-412.

In block 406, the node initially determines how long the transmission duration will be to transmit the data. For various networks on which the node communicates, the transmission duration may be based on the size of the data to be transmitted, the speed and/or bandwidth of the network (collectively referred to as the "data rate" or "bitrate"), and possibly other considerations, as can be appreciated. In general, the transmission duration can be expressed as:

$$\text{Transmission Duration} = \frac{(\text{\# of transmitted octets})(8 \text{ bits/octet})}{(\text{network bitrate})}$$

For example, in order to transmit 64 octets (sometimes referred to as bytes) of data with a network data bitrate of 250 kilobits/second (kb/s), the transmission duration is determined to be 0.002048 seconds or 2.048 ms, as shown in the calculation below:

$$\text{Transmission Duration} = 0.002048 \text{ s} = \frac{(64 \text{ octets})(8 \text{ bits/octet})}{(250 \text{ kb/s})}$$

Then, in block 409, an offset is calculated to determine what, if any, fractional portion of a time interval will be required to transmit the data. The offset can be expressed in the equation:

Offset=(transmission duration)mod(time interval length)

Returning to the previous example, if the node has a time interval length of 1 ms, the offset would be 0.048 ms or 48 microseconds (µs), as shown in the calculation below:

Offset=0.048 ms=(2.048 ms)mod(1 ms)

Continuing, in block 412, a transmission delay is calculated to determine the amount of time subsequent to a time interval boundary (i.e. a clock tick) that the node should use to delay transmission of the data in order for completion of a continuous transmission to coincide with, or be within a threshold thereafter of, completion of a time interval. The calculation of the transmission delay can be expressed as:

Transmission Delay=(time interval length)−(offset)−(offset)

Returning to the previous example, with an offset of 0.048 ms and a time interval length of 1 ms, the transmission delay would be 0.952 ms (952 µs) as shown in the calculation below:

Transmission Delay=0.952 ms=(1 ms)−(0.048 ms)

Next, in block 415, the node waits for a time interval boundary to use as a reference point from which to initiate the transmission delay prior to transmitting the data. In order to expedite transmission of the data, the node may often use the first time interval boundary encountered after the transmission delay is calculated. However, for purposes of optimizing the network event timer, a subsequent time interval boundary may instead be used. If a time interval boundary to be used has not yet occurred, execution of the method 400 returns to block 415 to continue the wait.

Alternatively, if the time interval boundary to be used is detected, in block 418, the node initiates the transmission delay to be followed by transmission of the data to the network. To carry this out, the node may use a supplementary timer configured with the transmission delay value, where the timer is started upon occurrence of the time interval boundary. The timer itself should be of sufficient resolution to enable the transmission of the data to begin at the intended time, within a precision tolerance range as can be appreciated. In some embodiments, the supplementary timer node may be a hardware timer with a resolution that is greater than the resolution of the clock used by the node.

Then, in block 421, the node determines if the transmission is complete. If the transmission is not complete, execution returns to block 421. Otherwise, if transmission of the data is complete, in block 424, the node initiates the network event timer associated with a waiting period following the data transmission. As described previously, the waiting period may be for a variety of purposes, such as waiting to receive an acknowledgement of the data transmission from a recipient, waiting for a period of time prior to transmitting additional data (i.e. transmitting data every 10 ms), and/or other possible purposes as can be appreciated. Thereafter, execution of this portion of the method 400 implemented in the node ends as shown. The method 400 may be carried out by the node for any data transmission by the node for which a time-defined waiting period should be carried out following the data transmission.

Figure 5:
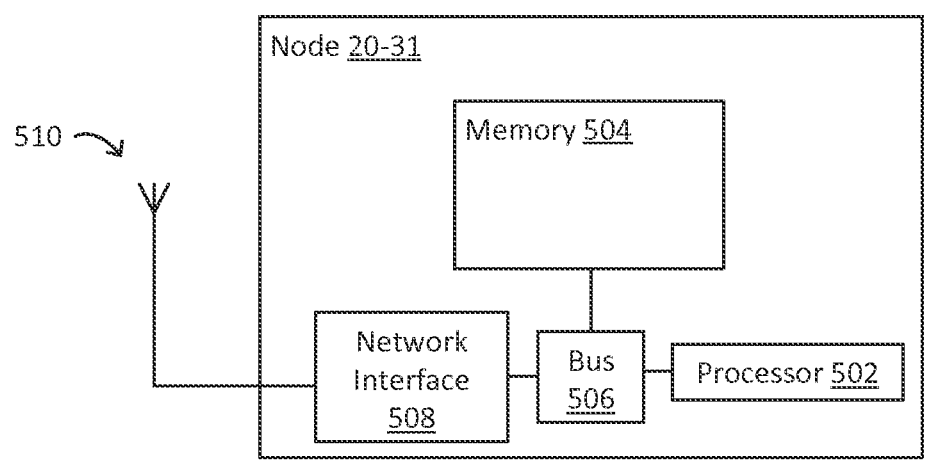
FIG. 5 is a schematic block diagram that provides one example illustration of a node employed in the network of FIG. 1 according to various embodiments of the present disclosure.

Next, in FIG. 5, shown is a block diagram depicting an example of a node 20-31 used for implementing the techniques disclosed herein within a wireless mesh network or other data network. The node 20-31 can include a processing device 502. Non-limiting examples of the processing device 502 include a microprocessor, an application-specific integrated circuit ("ASIC"), a state machine, or other suitable processing device. The processing device 502 can include any number of processing devices, including one. The processing device 502 can be communicatively coupled to computer-readable media, such as memory device 504. The processing device 502 can execute computer-executable program instructions and/or access information respectively stored in the memory device 504.

The memory device 504 can store instructions that, when executed by the processing device 502, cause the processing device 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The nodes 20-31 can include a bus 506 that can communicatively couple one or more components of the node 20-31. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in a node 20-31 to store and execute programming code.

The nodes 20-31 can also include network interface device 508. The network interface device 508 can be a transceiving device configured to establish a one or more of the wireless communication links via an antenna 510. A non-limiting example of the network interface device 508 is an RF transceiver and can include one or more components for establishing a communication links to other nodes 20-31 in the mesh network 10.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for optimizing network event timers for a node in a network, the method comprising:
    obtaining data for transmission by the node via the network, wherein the node uses time intervals of a clock as a basis for determining actions associated with the network;
    calculating a transmission duration corresponding to a time for transmitting the data via the network based on a data rate of the network and a size of the data;
    calculating a transmission delay based on the transmission duration, wherein the transmission delay is less than a clock interval and the transmission delay controls when transmission of the data is completed by the node;
    after the expiration of the transmission delay, transmitting the data; and
    waiting to receive an acknowledgement of the data from a recipient, wherein an event timer is initiated when said transmission of the data is completed, the event timer measuring time based upon counting the time intervals elapsed since the event timer begins.

2. The method of claim 1, further comprising:
    calculating an offset that is equal to a remainder from the transmission duration divided by a length of each of the time intervals; and
    calculating the transmission delay that is equal to a difference between the offset and the length of each of the time intervals.

3. The method of claim 1, wherein said transmitting the data begins after one or more of the time intervals have elapsed followed by a length of time equal to the transmission delay.

4. The method of claim 1, wherein the network uses Institute of Electrical and Electronics Engineers (IEEE) 802.15.4 standards.

5. The method of claim 1, wherein the node further comprises a transmission timer that is of a higher resolution than the clock, the transmission timer determining when to begin said transmitting the data.

6. The method of claim 1, wherein the data transmitted via the network requires the acknowledgement to be sent from the recipient of the data, the event timer being associated with a timeout for receiving the acknowledgment.

7. The method of claim 1, wherein the data comprises a payload and a frame to transmit the payload on the network.

8. A non-transitory computer-readable medium embodying a program executable in a node, the program comprising code that:
    obtains data for transmission by the node via a network, wherein the node uses time intervals of a clock as a basis for determining actions associated with the network;
    calculates a transmission duration corresponding to a time for transmitting the data via the network based on a data rate of the network and a size of the data;
    calculates a transmission delay based on the transmission duration, wherein the transmission delay is less than a clock interval and the transmission delay controls when transmission of the data is completed by the node;

transmits the data after expiration of the transmission delay; and initiates an event timer when said transmission of the data is completed, the event timer measuring time based upon counting the time intervals elapsed since the event timer begins.

9. The non-transitory computer-readable medium of claim 8, wherein said transmitting the data begins after one or more of the time intervals have elapsed followed by a length of time equal to the transmission delay.

10. The non-transitory computer-readable medium of claim 8, wherein the program further comprises code that:

calculates an offset that is equal to a remainder from the transmission duration divided by a length of each of the time intervals; and calculates the transmission delay that is equal to a difference between the offset and the length of each of the time intervals.

11. The non-transitory computer-readable medium of claim 8, wherein the node further comprises a transmission timer that is of a higher resolution than the clock, the transmission timer determining when to begin said transmitting the data.

12. The non-transitory computer-readable medium of claim 8, wherein the data comprises a payload and a frame to transmit the payload on the network.

13. The non-transitory computer-readable medium of claim 8, wherein the data transmitted via the network requires an acknowledgement to be sent from a recipient of the data, the event timer being associated with a timeout for receiving the acknowledgment.

14. A node, comprising:

a processor;

a network interface for communicating on a network; and a memory configured by a timer optimization application executed in the node, the timer optimization application causing the node to:

obtain data for transmission by the node via the network, wherein the node uses time intervals of a clock as a basis for determining actions associated with the network;

calculate a transmission duration corresponding to a time for transmitting the data via the network based on a data rate of the network and a size of the data;

calculate a transmission delay based on the transmission duration, wherein the transmission delay is less than a clock interval and the transmission delay controls when transmission of the data is completed by the node;

transmit the data after expiration of the transmission delay; and wait to receive an acknowledgement of the data from a recipient, wherein an event timer is initiated when said transmission of the data is completed, the event timer measuring time based upon counting the time intervals elapsed since the event timer begins.

15. The node of claim 14, wherein said transmitting the data begins after one or more of the time intervals have elapsed followed by a length of time equal to the transmission delay.

16. The node of claim 14, wherein the node further comprises a transmission timer that is of a higher resolution than the clock, the transmission timer determining when to begin said transmitting the data.

17. The node of claim 14, wherein the timer optimization application further causes the node to:

calculate an offset that is equal to a remainder from the transmission duration divided by a length of each of the time intervals; and calculate the transmission delay that is equal to a difference between the offset and the length of each of the time intervals.

18. The node of claim 14, wherein the data transmitted via the network requires the acknowledgement to be sent from the recipient of the data, the event timer being associated with a timeout for receiving the acknowledgment.

19. The node of claim 14, wherein the data comprises a payload and a frame to transmit the payload on the network.

20. The node of claim 14, wherein said transmission of the data completes within a tolerance threshold after one of the time intervals.

* * * * *